United States Patent
Chung et al.

(10) Patent No.: US 9,509,813 B2
(45) Date of Patent: Nov. 29, 2016

(54) ELECTRONIC DEVICE HOUSING AND METHOD OF ASSEMBLY

(71) Applicant: GOOGLE TECHNOLOGY HOLDINGS LLC, Mountain View, CA (US)

(72) Inventors: Se Hun Chung, Libertyville, IL (US); Myoung Hwan Lee, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 26 days.

(21) Appl. No.: 14/042,934

(22) Filed: Oct. 1, 2013

(65) Prior Publication Data

US 2015/0091418 A1 Apr. 2, 2015

(51) Int. Cl.
| | |
|---|---|
| *H04M 1/00* | (2006.01) |
| *H04M 1/02* | (2006.01) |
| *G06F 1/16* | (2006.01) |

(52) U.S. Cl.
CPC .............. *H04M 1/0262* (2013.01); *G06F 1/16* (2013.01); *H04M 1/0249* (2013.01); *Y10T 29/49826* (2015.01)

(58) Field of Classification Search
CPC .............. H04W 88/02; H04W 12/12; H04W 52/0209; A61M 2209/088; H01M 10/44; H01M 10/4257; H01M 10/441; H01M 10/482; H01M 2/1005; H01M 2/1055; G06F 21/35; G06F 1/266; H02J 7/0045; H02J 7/0027

USPC ....................................................... 455/575.1
See application file for complete search history.

(56) References Cited

U.S. PATENT DOCUMENTS

2009/0098827 A1* 4/2009 Koyama ..................... 455/41.2
2013/0017867 A1* 1/2013 Lee et al. ..................... 455/566

OTHER PUBLICATIONS

XDA Developers, "RAZR to RAZR MAXX Conversion Guide", http://www.xda-developers.com/android/introducing-xdadevcon-a-conference-for-developers-by-developers/, Dec. 14, 2012, 14 pages.
iteckparts.com, "Motorola Razr i XT890 Brand New Original Housing Back Door Cover Repair Part—Black", http://iteckparts.com/product_info_cpath-25_26_products_id-723.html, Oct. 1, 2013, 7 pages.

* cited by examiner

*Primary Examiner* — Kwasi Karikari
(74) *Attorney, Agent, or Firm* — Brake Hughes Bellermann LLP

(57) ABSTRACT

A housing for an electronic device is described. The housing has a front housing and a rear housing attached to the front housing. The rear housing has a first opening over a non-removable battery and at least one antenna integrated into an outside surface of the rear housing. The front housing and the rear housing define an enclosure containing the non-removable battery. The housing includes a battery cover attached to the rear housing at the first opening. The housing also includes a removable rear cover attached to the rear housing. The rear cover conceals the battery cover and provides structural support to the rear housing.

16 Claims, 10 Drawing Sheets

ELECTRONIC DEVICE HOUSING AND METHOD OF ASSEMBLY

TECHNICAL FIELD

The present disclosure relates generally to electronic devices and, more particularly, to housings for electronic devices.

BACKGROUND

Manufacturers of portable electronic devices, such as smartphones and media players, design housings for those devices with the expectation that they may be dropped or otherwise mishandled. The housings generally can withstand moderate impacts while keeping electronic components within the housing in operating condition. The manufacturers balance the strength and durability of the housing with the size, aesthetics, weight, and other factors. Additionally, consumers may purchase after-market accessories, such as cases or covers, to provide an additional physical layer around the electronic device or to make the device more attractive.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
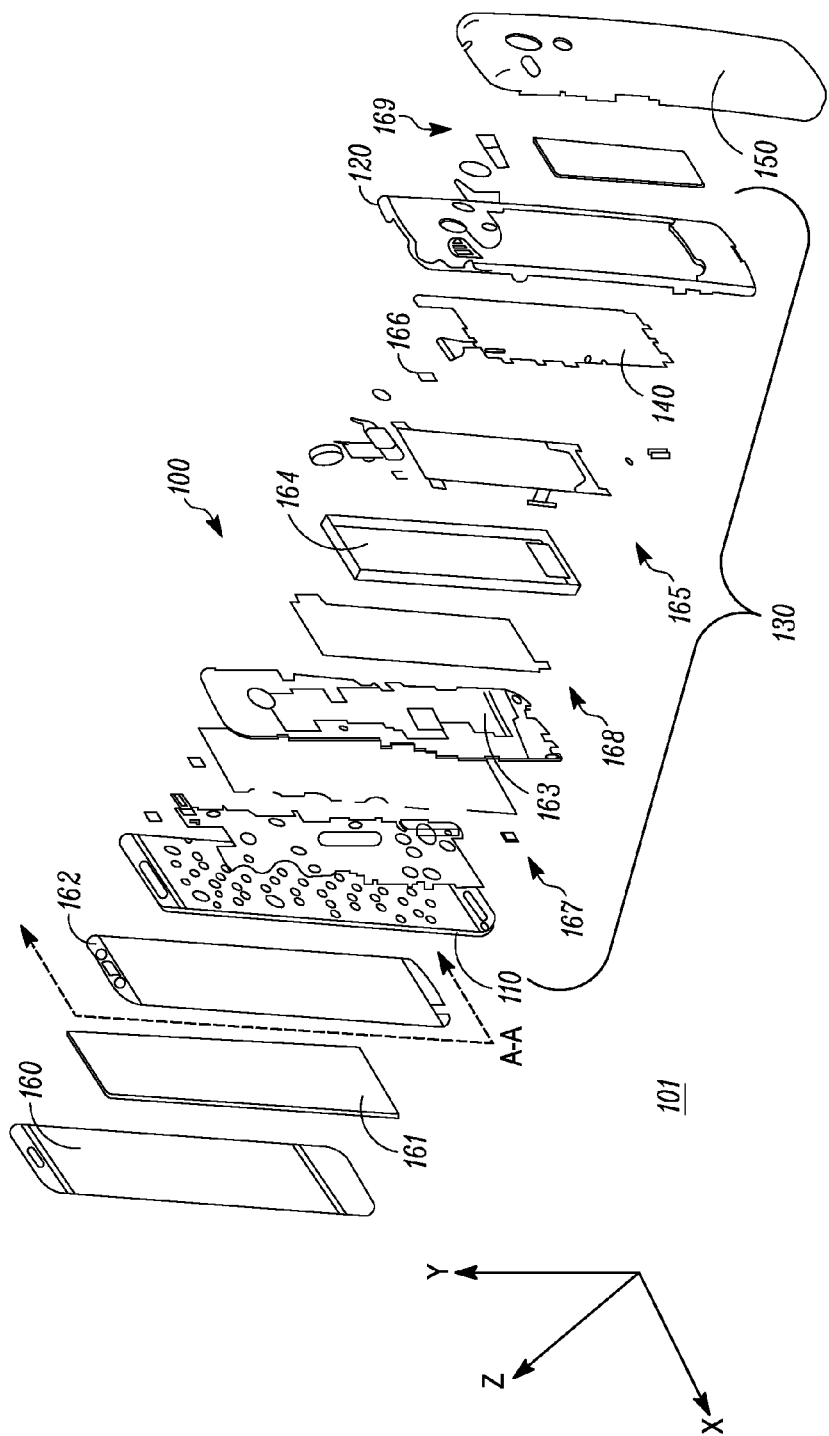
FIG. 1 is an exploded perspective view of a housing for an electronic device, the housing including a front housing, rear housing, battery cover, and rear cover, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present disclosure is directed to a housing for an electronic device. In various embodiments, the housing includes a front housing, a rear housing, a battery cover, and a removable rear cover. An antenna of the electronic device is integrated with an outside surface of the rear housing. The battery cover conceals a battery of the electronic device. The removable rear cover, in turn, conceals the battery cover and provides structural support to the rear housing. The removable rear cover can also act as a cover for a Subscriber Identity Module ("SIM") card or micro Secure Digital ("SD") card.

According to another embodiment, an electronic device includes a front housing and a rear housing. The rear housing attaches to the front housing. Located behind the front housing is a battery, which is not designed to be removable by the user. A battery cover, located behind the battery, is also not designed to be removable by the user. The rear housing has an opening over at least part of the battery cover and has at least one antenna integrated into its outside surface. A radio transceiver of the electronic device, located in front of the rear housing (between the front housing and the rear housing), is coupled to the antenna. The electronic device also has a user-removable rear cover attached behind the rear housing. The rear cover provides structural support to the rear housing and shields the battery cover and the antenna from contact by the user.

Another embodiment of the disclosure is a method for assembling a housing of an electronic device. The method involves attaching a battery cover to a rear housing at an opening of the rear housing, attaching the rear housing to a front housing, and attaching a removable rear cover to the rear housing. The rear cover provides structural support to the rear housing, shields the battery cover from contact by a user, and shields at least one antenna formed on an outer surface of the rear housing from contact by the user of the electronic device. The front housing and the rear housing define an enclosure that contains a non-removable battery.

The various embodiments of the disclosure provide an alternative to after-market cases. A manufacturer of the electronic device can, for example, produce the rear cover using different colors and designs so as to make the electronic device as a whole customizable by the user.

Figure 2:
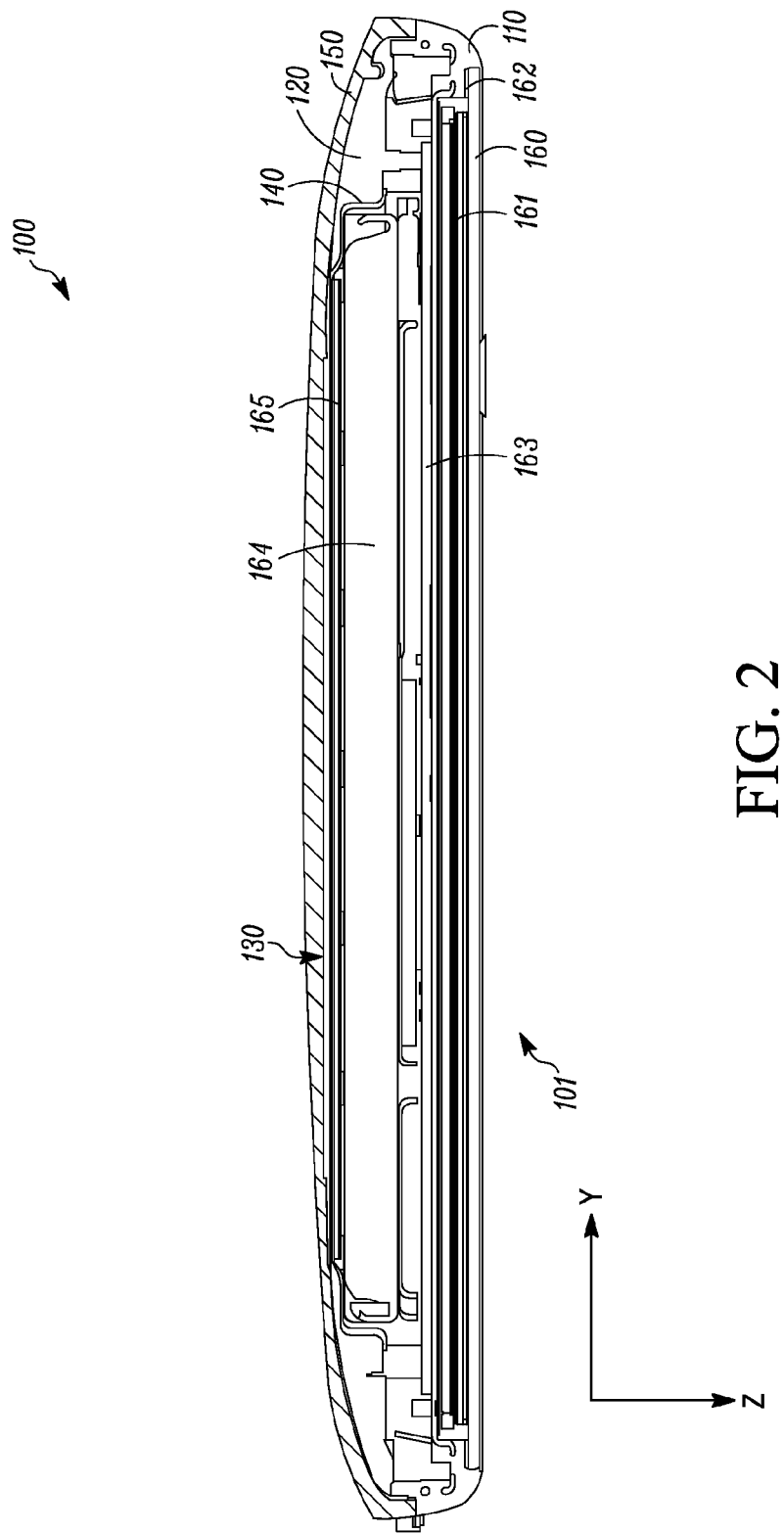
FIG. 2 is a cross-sectional view of the housing of FIG. 1 along section A-A, according to an embodiment.
Figure 3:
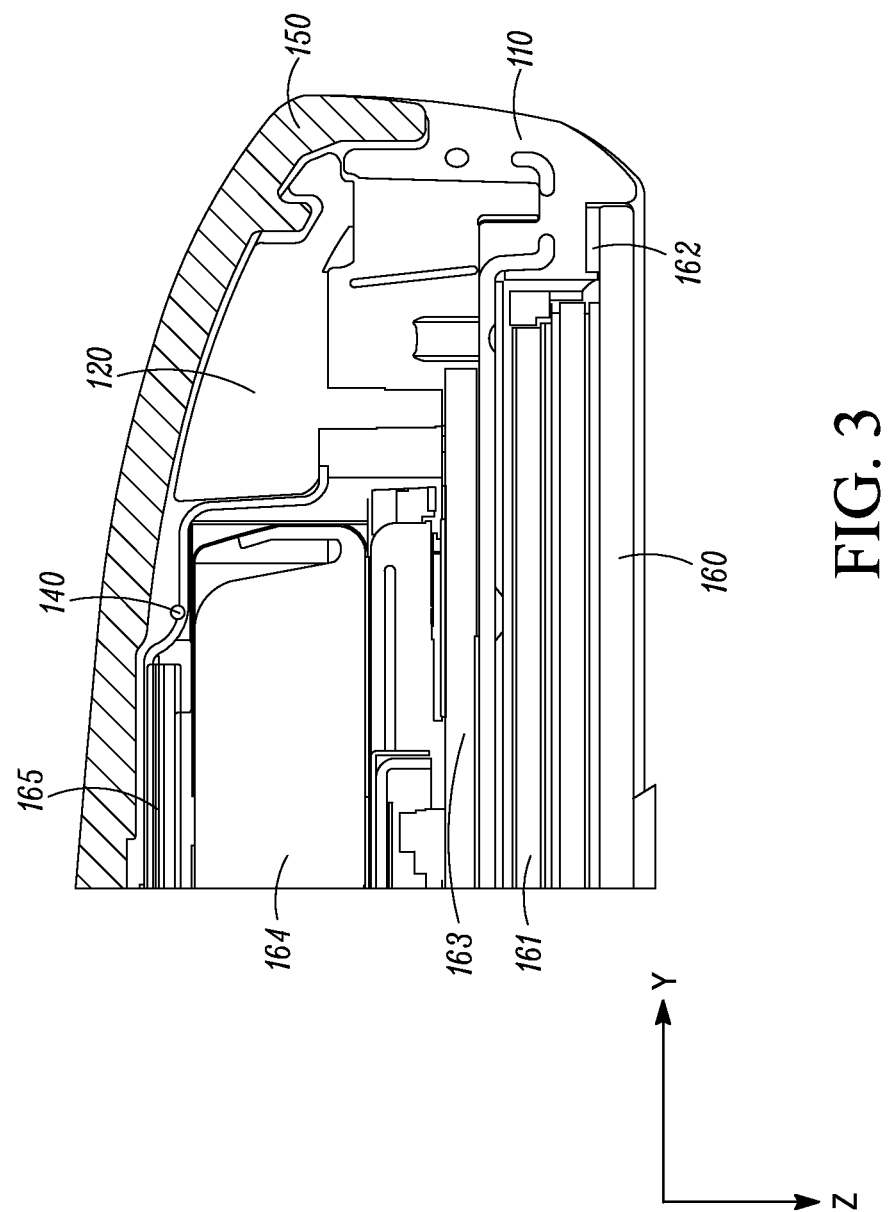
FIG. 3 is a partial cross-sectional view of the housing of FIG. 1 along section A-A, according to an embodiment.
Figure 4:
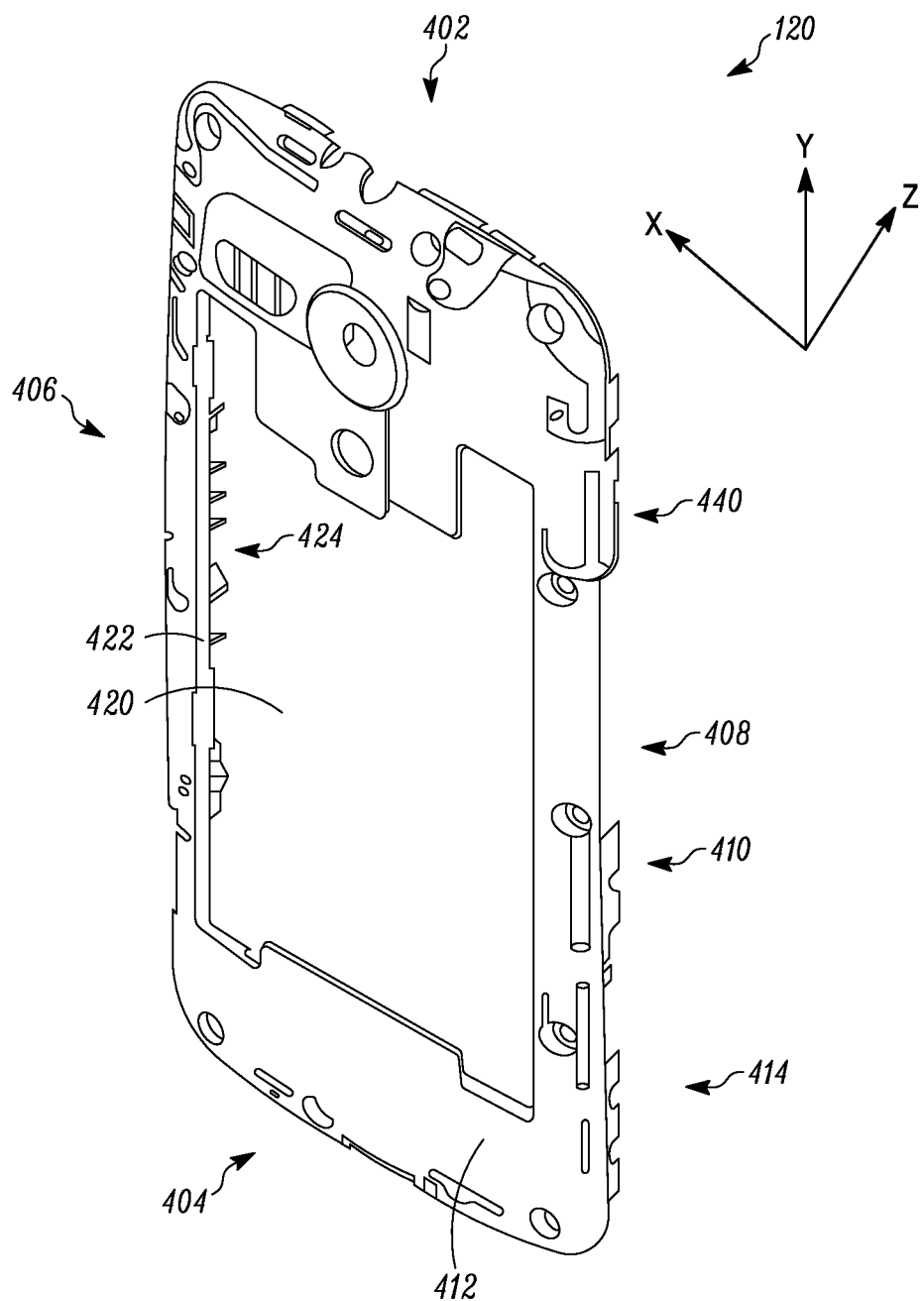
FIG. 4 is a rear perspective view of the rear housing of FIG. 1, according to an embodiment.

FIG. 1, FIG. 2, and FIG. 3 show an exploded view (FIG. 1), a cross-sectional view (FIG. 2), and a partial cross-sectional view (FIG. 3) of one embodiment of a housing 100 for an electronic device 101. The housing 100 includes a front housing 110 and a rear housing 120 configured to be attached to each other. In one implementation, the front housing 110 and rear housing 120 attach via one or more of a snap-fit engagement, screws, adhesive or bonding material, plastic welding, mechanical connection components, or other attachment configurations. When attached, the front housing 110 and rear housing 120 form an enclosure 130 of the housing 100 for one or more components of the electronic device 101. While only a single enclosure 130 is shown for simplicity, in alternative embodiments the housing 100 may have a plurality of enclosures.

The housing 100 further includes a battery cover 140 and a user-removable rear cover 150. The rear cover 150 shields antennas (604, 606, 608, 610 of FIG. 6) located on the rear housing 120 from contact by a user of the electronic device 101 during operation of the electronic device 101. The rear cover 150 also conceals the battery cover 140 and provides structural support to the rear housing 120. The battery cover 140 may provide further structural support to the rear housing 120 such that the rear housing 120, the battery cover 140, and rear cover 150 cooperate to provide sufficient structural strength for the electronic device 101.

The rear cover 150 is removable by a user after at least an initial assembly of the housing 100. In one example, the rear cover 150 and the rear housing 120 attach to each other via one or more of a snap-fit engagement, re-usable adhesive, screws, or a combination thereof. Accordingly, a user may replace the rear cover 150 after receipt or purchase of the electronic device 101. This allows a user to remove the rear cover 150 for repair or replacement of components of the housing 100 or electronic device 101 (such as SIM cards or memory cards), or based on the user's aesthetic or design preference.

In the implementation shown in FIG. 1, the electronic device 101 includes a lens 160, a touch-screen display 161, a spacer 162, a circuit board 163, a battery 164, a flexible circuit board 165, a lighting element 166 (e.g., a camera flash), and other assembly components 167, 168, and 169. The circuit board 163 in one example includes a radio transceiver (not shown) and application processor (not shown) for the electronic device 101. The flexible circuit board 165 includes one or more circuits that support the components of the electronic device 101, such as a lighting element flash circuit, near field communication ("NFC") circuit, antenna, contactless charging circuit, or combinations or variations thereof.

Referring to FIG. 1, the front housing 110 is closest to the user, relative to the rear housing 120, when the user views the touch-screen display 161. The components contained within the enclosure 130 are thus behind the front housing 110 and in front of the rear housing 120. For example, the battery 164 is located behind the front housing 110 (i.e., further from the user relative to the front housing 110). The battery cover 140 is further behind the battery 164 (i.e., further still from the user relative to the front housing 110). As shown in FIG. 1, the enclosure 130 contains the circuit board 163, the battery 164, the flexible circuit board 165, the lighting element 166, and the assembly components 167 and 168. In other embodiments, the enclosure 130 may contain fewer components or additional components of the electronic device 101, such as a speaker, memory, vibration motors, actuators, sensors, cables, antennas, and the like. The housing 100 is configured such that the battery 164 is non-removable by a user, for example, to prevent tampering with or damage to the battery 164 or injury to the user. In this case, the battery cover 140 as well as battery 164 are configured to be non-user-removable.

FIG. 4, FIG. 5, FIG. 6, and FIG. 7 show an embodiment of the rear housing 120 of FIG. 1 in rear perspective (FIG. 4), front perspective (FIG. 5), rear (FIG. 6), and front (FIG. 7) views. The rear housing 120 has a top 402, bottom 404, and lateral sides 406 and 408 that form an outer perimeter 410. The rear housing 120 also has an outward face 412 and an inward face 414. The outward face 412 is configured to engage the rear cover 150. The inward face 414 is configured to engage the front housing 110. In other embodiments, all or a portion of the outer perimeter 410 is configured to engage the front housing 110.

Figure 5:
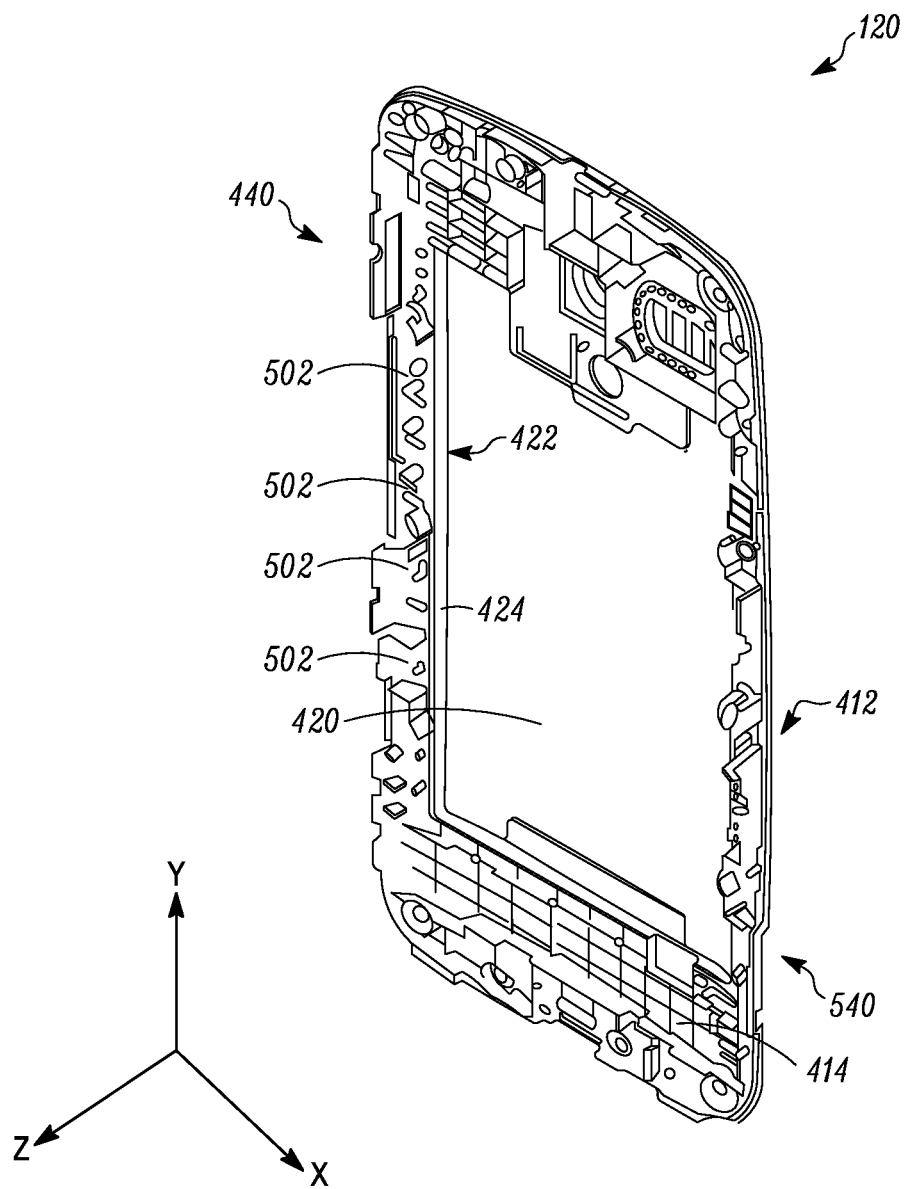
FIG. 5 is a front perspective view of the rear housing of FIG. 1, according to an embodiment.

The outer perimeter 410 surrounds a first opening 420 of the rear housing 120. The first opening 420 allows for reduced weight of the rear housing 120. Although the opening 420 results in a less durable structure relative to a rear housing without the opening, a rear cover 150 (as seen in FIGS. 1, 2, and 3) adds durability to the entire electronic device 101 and may compensate for the reduced structure. The first opening 420 has an interior face 422 along an inner perimeter 424 of the rear housing 120. The first opening 420 is located generally over the battery 164. In other implementations, the battery 164 may be partially concealed by the rear housing 120. The battery cover 140 is configured to attach to the rear housing 120 at the first opening 420, for example, along the inner perimeter 424. Referring to FIG. 5, the rear housing 120 has a plurality of tabs 502 configured to engage corresponding slots 806 (FIG. 8) of the battery cover 140. While the battery cover 140 is shown as being attached to the inward face 414 of the rear housing 120, in alternative implementations the battery cover 140 is attached to the outward face 412.

Figure 6:
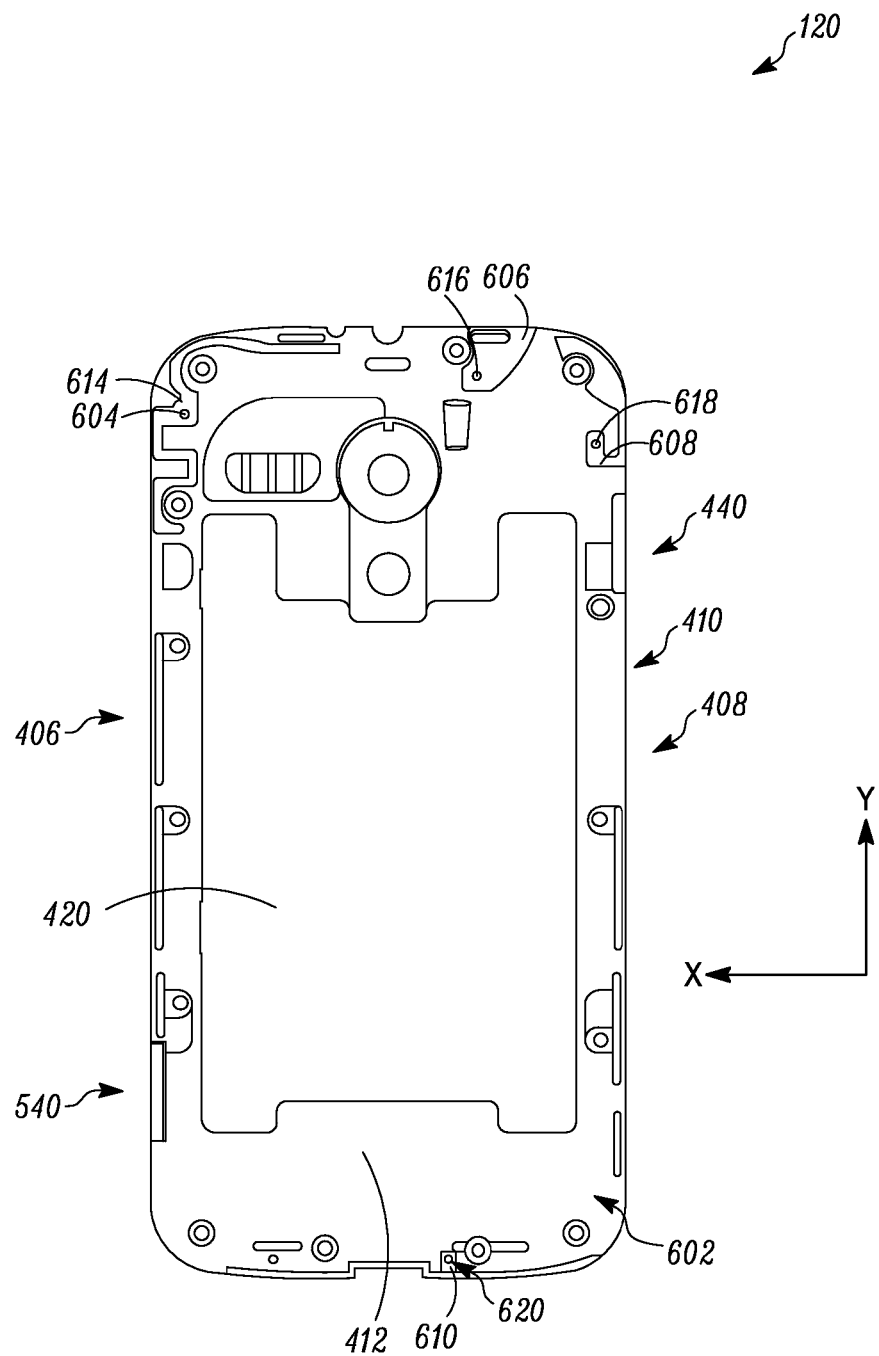
FIG. 6 is a rear view of the rear housing of FIG. 1, according to an embodiment.
Figure 7:
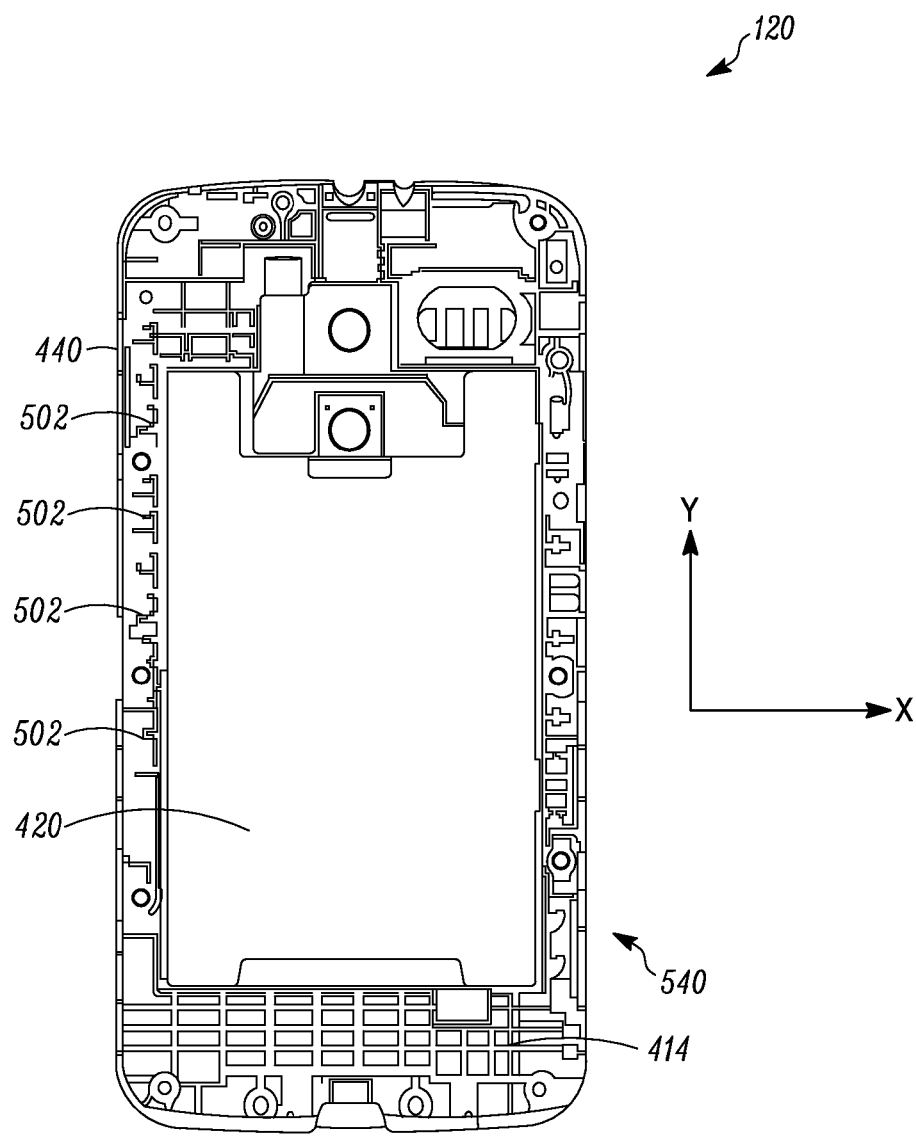
FIG. 7 is a front view of the rear housing of FIG. 1, according to an embodiment.

The rear housing 120 includes one or more second openings, such as openings 440 (FIG. 4) and 540 (FIG. 5). As shown in FIG. 6, the second openings 440 and 540 are located on lateral sides 408 and 406, respectively. The second openings 440 and 540 are configured to receive a card-shaped device (not shown) for at least partial insertion into the enclosure 130. Examples of the card-shaped device include a memory card or subscriber identity module ("SIM") card. Accordingly, a SIM card may be inserted through the second opening 440 or 540 to operatively engage the circuit board 163. The rear cover 150 blocks the opening 440 or 540 in order to shield or protect the card-shaped device from contact when the cover 150 is attached to the rear housing 120. However, the user may remove the rear cover 120 to access or remove the card-shaped device (s). In this case, the rear cover 120 acts as a door to the opening(s) 440 or 540 without the use of additional doors or openings within the electronic device 101.

Referring to FIG. 6, the rear housing 120 has an outside surface 602 that includes the outer perimeter 410 and the outward face 412. At least one antenna for the electronic device 101 is integrated into the outside surface 602. As shown in the example of FIG. 6, antennas 604, 606, 608 and 610 are integrated into the outside surface 602. The rear housing 120 may also include one or more vias 614, 616, 618, and 620 that operatively couple the antennas 604, 606, 608, and 610, respectively, with the circuit board 163 (e.g., to the radio transceiver) or other internal connection point.

The rear housing 120 in one embodiment is formed from a plastic-based material. Examples of the plastic-based material include polycarbonate, polyethylene, polypropylene, polyvinyl chloride, polyoxymethylene, acrylonitrile butadiene styrene, or other injection-moldable plastics. The rear housing 120 is configured for structural support of the electronic device 101. The rear housing 120 in one example is configured as a molded interconnect device. In this case, one or more of the antennas 604, 606, 608, or 610 may be integrated into the outside surface 602 of the rear housing 120 using molded interconnect techniques. In one embodiment, the rear housing 120 is formed from a plastic-based material that includes a metal additive compatible with a laser direct structuring ("LDS") process. After an initial formation of the rear housing 120, the rear housing is irradiated with a laser along a pattern for the antennas. The laser interacts with the metal additive to allow further deposition of a metal or other conductive layer for formation of the antennas. In another embodiment, the rear housing 120 and antennas are formed using a two-shot molding process with a platable substrate (e.g., acrylonitrile butadiene styrene plastic) and another substrate (e.g., polycarbonate).

The battery cover 140 in one example is formed from a polyethylene terephthalate (PET)-based film, for example, as a PET thin-film tray. The rear cover 150 in one embodiment is formed from a plastic-based material. Examples of the plastic-based material include polycarbonate, polyethylene, polypropylene, polyvinyl chloride, polyoxymethylene, acrylonitrile butadiene styrene, or other injection-moldable plastics. The rear cover 150 may also be formed from materials including Kevlar or carbon fiber. The PET film of the battery cover 140 allows for a relatively light and thin battery cover 140 as compared to a rear housing that covers the battery (e.g., without an opening for reduced weight). The battery cover 140 in one example is approximately 0.15 mm thick (e.g., film thickness) while the rear housing 120 is approximately 1 mm thick. The battery cover 140 in one example is attached or bonded to the rear housing 120 with adhesive or plastic welding. The battery cover 140 conceals and substantially prevents user contact with the battery 164 when the rear cover 150 is removed, but without additional thickness and weight of a separate plastic cover or battery door.

Figure 8:
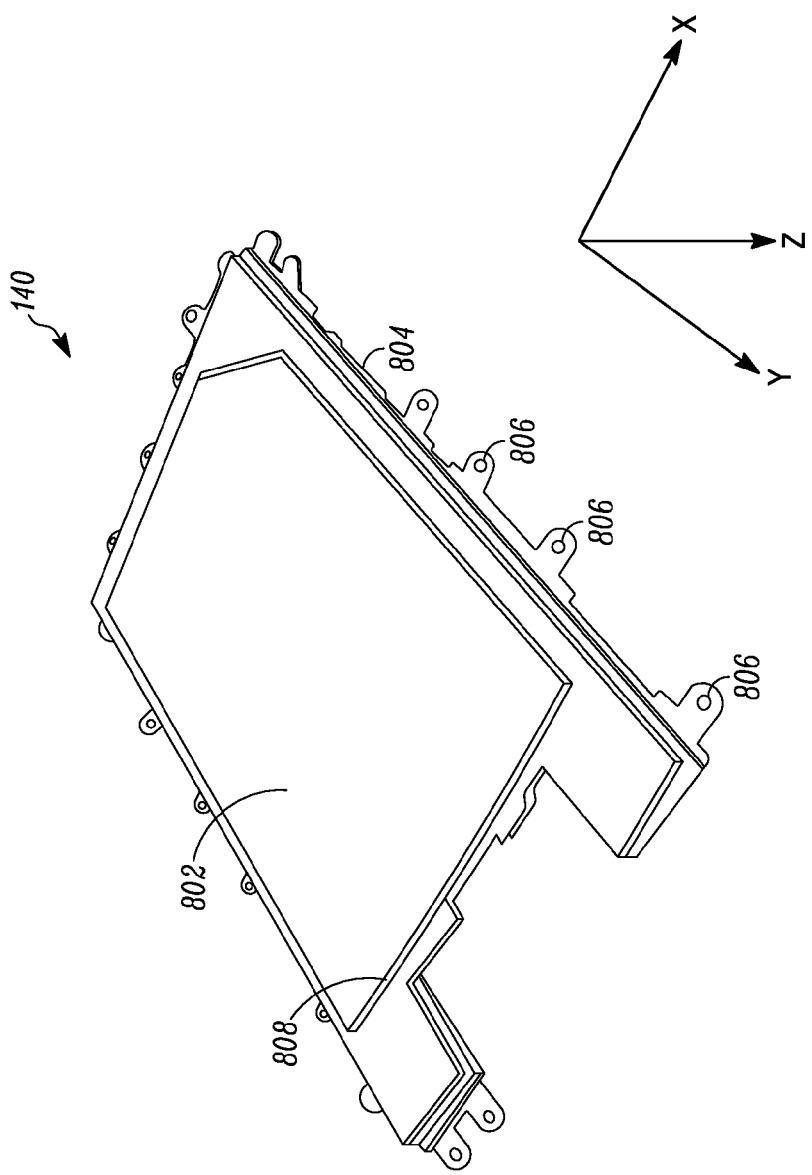
FIG. 8 is a rear perspective view of the battery cover of FIG. 1, according to an embodiment.
Figure 9:
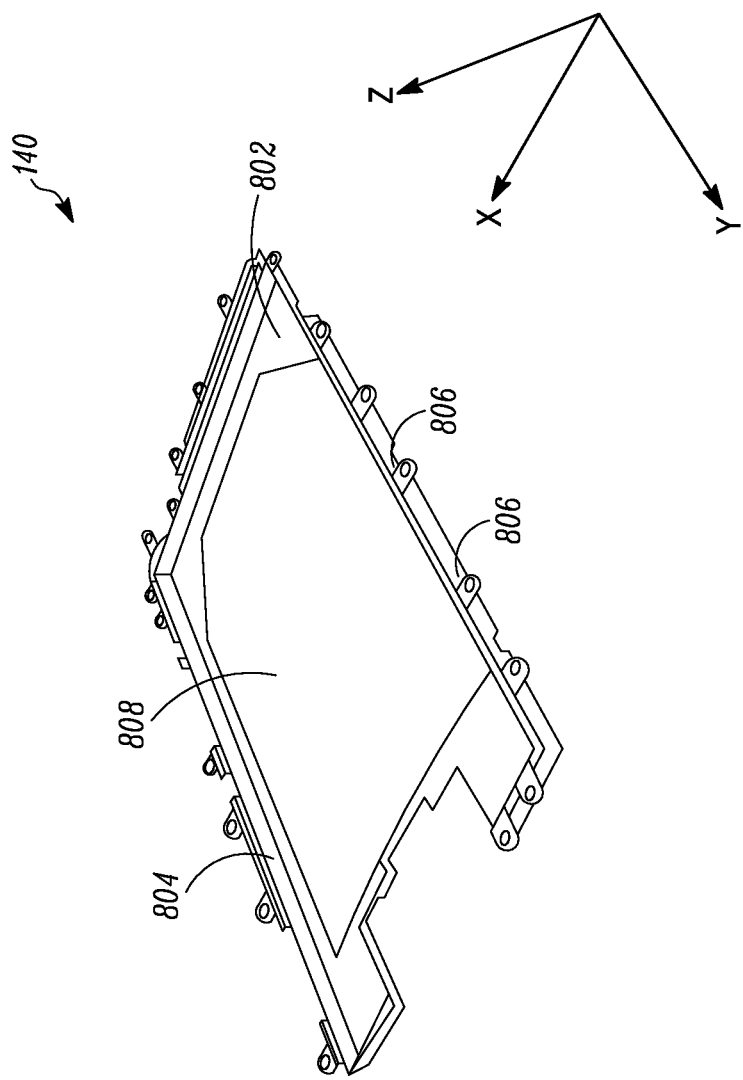
FIG. 9 is a front perspective view of the battery cover of FIG. 1, according to an embodiment.

FIG. 8 and FIG. 9 show the battery cover 140 in rear perspective (FIG. 8) and front perspective (FIG. 9) views. The battery cover 140 comprises a base 802 and at least one perimeter portion 804. The perimeter portion 804 extends from the base 802 towards an interior of the enclosure 130. The battery cover 140 generally conforms to a shape of the battery 164. The base 802 is configured to substantially cover the first opening 420. The perimeter portion 804 is configured to abut the interior face 422 along the inner perimeter 424 of the rear housing 120. The perimeter portion 804 in one example extends to overlap a portion of the inward face 414.

The battery cover 140 is configured to receive one or more of a spacer or the flexible circuit board 165. In one example, the battery cover 140 has a recess 808 that conforms to the spacer or flexible circuit board 165. In a further example, the spacer or flexible circuit board 165 is attached to the battery cover 140 with an adhesive. The spacer or flexible circuit board 165, in one example, helps hold the battery 164 in a desired position.

Figure 10:
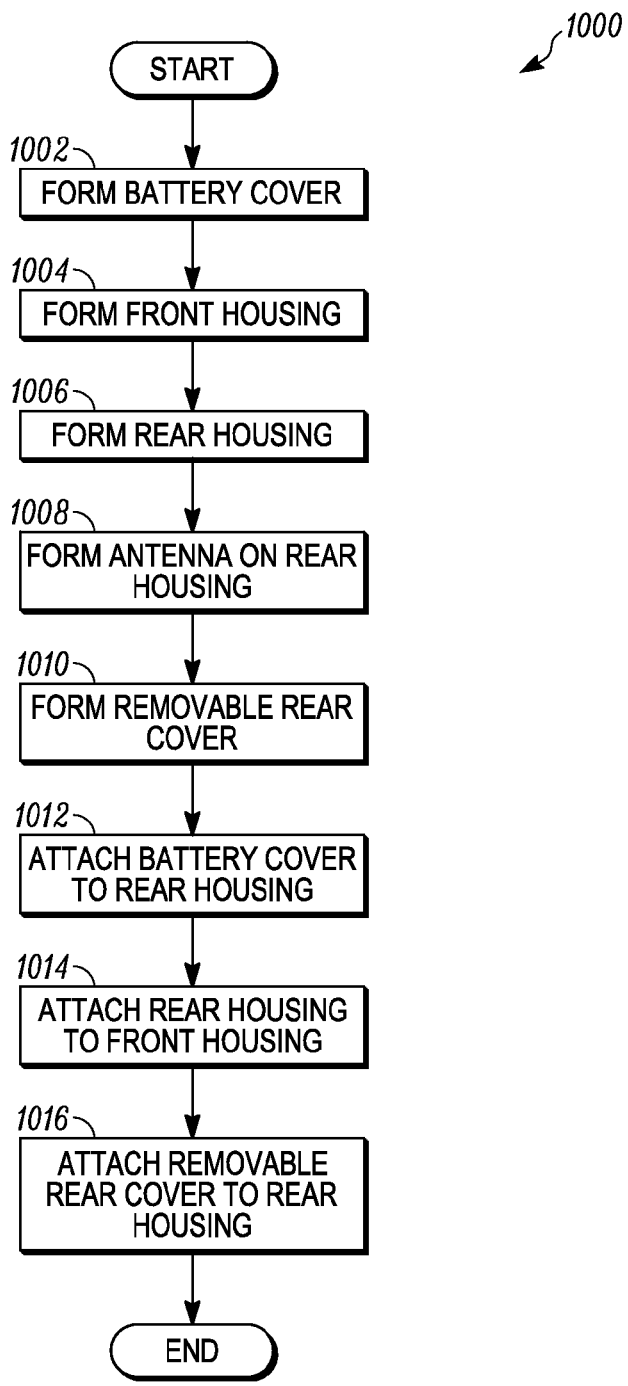
FIG. 10 is a process flow of a method for assembly of a housing for the electronic device of FIG. 1, according to an embodiment.

Turning to FIG. 10, a process flow 1000 illustrates a method for assembly of a housing for an electronic device, according to an embodiment. The battery cover 140 is formed (1002) from a PET film. The front housing 110 is formed (1004) from a plastic material. The rear housing 120 is formed (1006) from a plastic-based material that includes a metal additive compatible with a laser direct structuring process. The antenna is formed (1008) on the rear housing 120. For example, the rear housing 120 is lased and plated to form the antenna. The removable rear cover 150 is formed (1010) from a plastic material. The battery cover 140 is attached (1012) to the rear housing 120. For example, the battery cover 140 is welded to the rear housing 120. The rear housing 120 is attached (1014) to the front housing 110. One or more components of the electronic device 101 may be attached to the front housing 110 or the rear housing 120 prior to the attachment (1014). The removable rear cover 150 is attached (1016) to the rear housing 120.

It can be seen from the foregoing that a method and device that allow for a removable rear cover for a housing of an electronic device. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. A housing for an electronic device, the housing comprising:
   a front housing;
   a rear housing attached to the front housing, the rear housing having:
      a first opening over a battery,
      a second opening configured to receive a card-shaped device for at least partial insertion into the enclosure, and
      at least one antenna integrated into an outside surface of the rear housing,
   wherein the front housing and the rear housing define an enclosure containing the battery;
   a battery cover attached to the rear housing at the first opening; and
   a removable rear cover attached to the rear housing, wherein the rear cover conceals the battery cover, and provides structural support to the rear housing.

2. The housing for an electronic device of claim 1, wherein the rear cover shields the at least one antenna from contact by a user of the electronic device.

3. The housing for an electronic device of claim 1 wherein the second opening is located at a lateral side of the rear housing.

4. The housing for an electronic device of claim 1 wherein the rear cover is configured to shield the second opening from contact by a user of the electronic device.

5. The housing for an electronic device of claim 1 wherein the battery cover comprises:
   a polyethylene terephthalate (PET)-based film.

6. The housing for an electronic device of claim 1 wherein the rear housing comprises:
   a plastic-based material.

7. The housing for an electronic device of claim 6 wherein the plastic-based material comprises:
   a metal additive compatible with a laser direct structuring process.

8. The housing for an electronic device of claim 7 wherein the at least one antenna is integrated into the outside surface of the rear housing using the laser direct structuring process.

9. A housing for an electronic device, comprising:
   a front housing;
   a rear housing attached to the front housing, the rear housing having:
      a first opening over a battery, and
      at least one antenna integrated into an outside surface of the rear housing,
   wherein the front housing and the rear housing define an enclosure containing the battery;
   a battery cover attached to the rear housing at the first opening, wherein the battery cover comprises:
      a base that substantially covers the first opening, and
      at least one perimeter portion that extends from the base towards an interior of the enclosure, wherein the at least one perimeter portion abuts an interior face of the first opening; and
   a removable rear cover attached to the rear housing, wherein the rear cover conceals the battery cover, and provides structural support to the rear housing.

10. The housing for an electronic device of claim 9 wherein the base of the battery cover has a recess configured to receive a flexible circuit board.

11. An electronic device comprising:
   a front housing;

a battery behind the front housing;
a battery cover behind the battery;
a rear housing attached to the front housing, the rear housing comprising a plastic-based material with a metal additive compatible with a laser direct structuring process, the rear case having:
  a first opening over at least part of the non-user-removable battery cover, and
  at least one antenna integrated into an outside surface of the rear housing;
a radio transceiver, coupled to the at least one antenna, in front of the rear housing; and
a user-removable rear cover attached behind the rear housing that provides structural support to the rear housing and shields the battery cover and the at least one antenna from contact by a user of the electronic device.

12. The electronic device of claim 11, wherein the front housing and the rear housing define an enclosure containing the battery, wherein the rear housing further comprises:
  a second opening configured to receive a card-shaped device for at least partial insertion into the enclosure, wherein the user-removable rear cover blocks the second opening.

13. The electronic device of claim 11 wherein the at least one antenna is integrated into the outside surface of the rear housing using the laser direct structuring process.

14. The electronic device of claim 11 wherein the battery cover comprises:
  a polyethylene terephthalate (PET)-based film.

15. A method for assembly of a housing for an electronic device, comprising:
  forming a rear housing from a plastic-based material that includes a metal additive compatible with a laser direct structuring process;
  lasing the rear housing to form at least one antenna on an outside surface of the rear housing;
  attaching a battery cover to the rear housing at a first opening of the rear housing;
  attaching the rear housing to a front housing to define an enclosure that contains a battery;
  attaching a removable rear cover to the rear housing to provide structural support to the rear housing,
    shield the battery cover from contact by a user of the electronic device, and
    shield the at least one antenna formed on the outside surface of the rear housing from contact by the user of the electronic device.

16. The method of claim 15 further comprising:
  attaching a flexible circuit board to the battery cover before attaching the rear housing to the front housing.

* * * * *